United States Patent [19]

Hill

[11] Patent Number: 5,000,147

[45] Date of Patent: Mar. 19, 1991

[54] IDLING SPEED REGULATING SYSTEM

[75] Inventor: William F. Hill, Stafford, England

[73] Assignee: Lucas Industries public limited company, Birmingham, England

[21] Appl. No.: 38,069

[22] Filed: Apr. 14, 1987

[30] Foreign Application Priority Data

Apr. 17, 1986 [GB] United Kingdom ............... 8609382

[51] Int. Cl.⁵ .............................................. F02P 5/15
[52] U.S. Cl. ...................................... 123/339; 123/418
[58] Field of Search ............... 123/416, 417, 418, 339

[56] References Cited

U.S. PATENT DOCUMENTS

| | | | |
|---|---|---|---|
| 4,112,895 | 9/1978 | Habert | 123/643 X |
| 4,262,644 | 4/1981 | Walker et al. | 123/416 X |
| 4,328,775 | 5/1982 | Ironside | 123/339 |
| 4,338,899 | 7/1982 | Geiger et al. | 123/339 |
| 4,446,832 | 5/1984 | Matsumura et al. | 123/339 |
| 4,506,639 | 3/1985 | Murakami et al. | 123/339 |
| 4,552,109 | 11/1985 | Boccadoro et al. | 123/339 |
| 4,572,127 | 2/1986 | Morris | 123/339 |

Primary Examiner—Tony M. Argenbright
Attorney, Agent, or Firm—Nixon & Vanderhye

[57] ABSTRACT

A system for regulating the idling speed of an internal combustion engine comprises a circuit for generating the ignition spark, when the engine is idling, upon expiry of a predetermined time delay from an initial crankshaft position, which circuit is enabled only after the crankshaft has reached a first limiting position, and enforced when the crankshaft reaches a second limiting position if the time delay has not expired. The spark timing therefore varies smoothly with speed between the first and second limiting positions of the crankshaft, but being retarded to the second limiting position for large over-speed errors or advanced to the first limiting position for large under-speed errors. It also reverts to the second limiting position for speeds below half normal idling speeds (cranking speeds). The time delay may be controlled in response to engine operating variables, for example using a closed-loop idling speed control of conventional type and preferably with phase advance compensation to further improve the dynamic response of the idling speed regulating system.

12 Claims, 5 Drawing Sheets

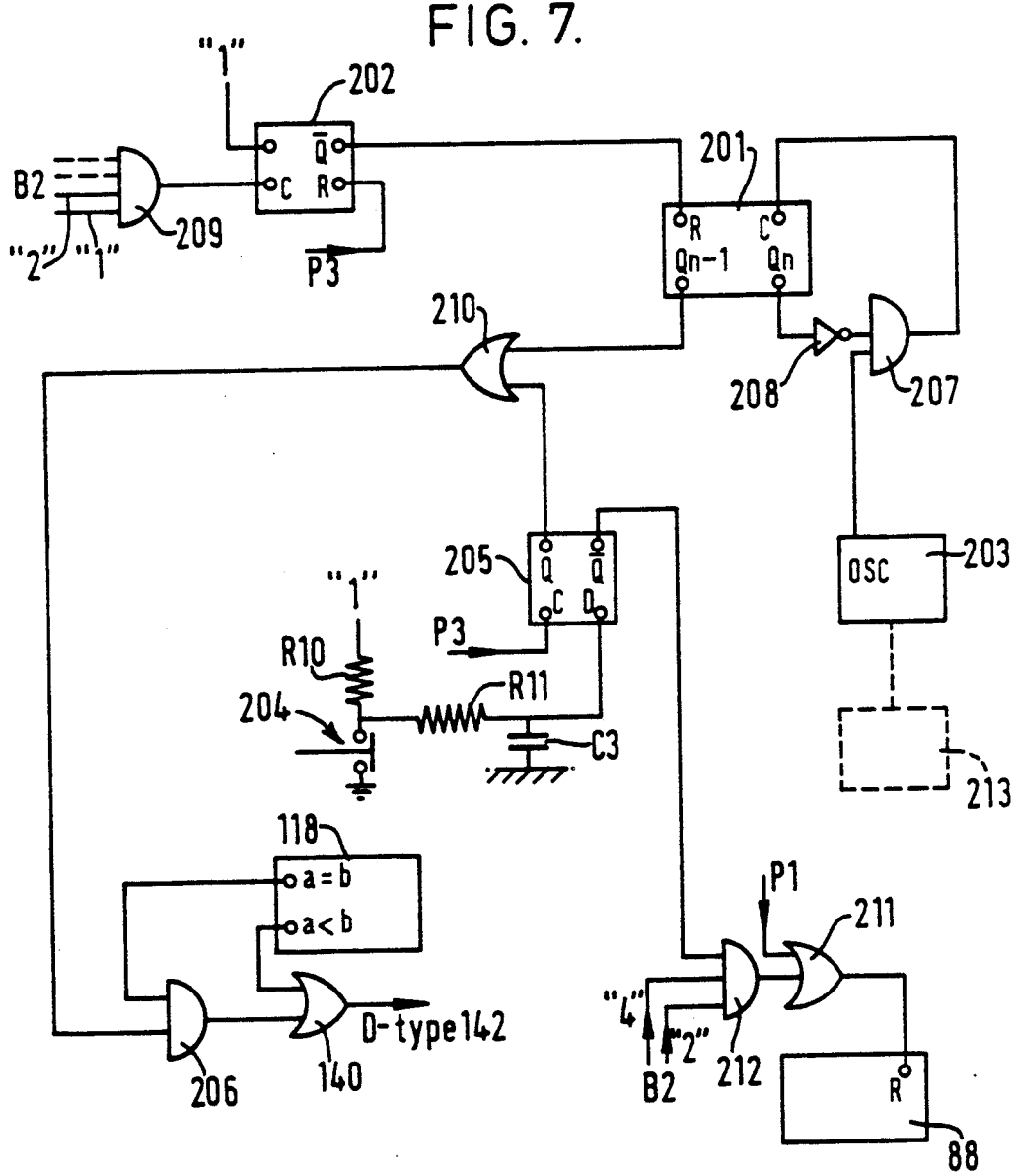

IDLING SPEED REGULATING SYSTEM

This invention relates to a system for regulating the idling speed of an internal combustion engine having spark-ignition.

Idling speed regulators of closed loop type are necessarily slow-acting so as to avoid oscillatory instability, in view of lags which occur in the speed control response. Thus these regulators provide good steady-state regulation, but their dynamic regulation is poor: even switching in an electrical load to the alternator can cause unacceptable transient speed changes and possibly risk stalling the engine.

U.S. Pat. No. 4,328,775 (Ironside) describes an idling speed regulator employing active ignition timing control to improve the response. The ignition timing is adjusted in accordance with a speed error signal, to provide an immediate correction in response to a change in engine speed (resulting from a change in the load on the engine): an air intake adjustment is also made in accordance with an integral of the speed error signal, and so takes place more slowly.

U.S. Pat. No. 4,338,899 (Geiger et al) describes an idling speed regulator in which the spark is generated on expiry of a predetermined time delay from actuation of the contact breaker on the previous cycle, such that the angle of advance will be smaller the greater the engine speed, thus providing the required idling speed regulation. But in this regulator, if the engine idling speed is below a predetermined minimum, the spark is generated at actuation of the contact breaker and the angle of advance is a minimum value, such that there is no longer any attempt to regulate the idling speed.

In accordance with this invention, there is provided a system for regulating the idling speed of an internal combustion engine having spark ignition, comprising means for generating the spark upon expiry of a predetermined time delay from an initial crankshaft position, which means is enabled only after the crankshaft has reached a first predetermined limiting position, and enforced when the crankshaft reaches a second predetermined limiting position if the time delay has not expired.

Relative to the Geiger regulator, this system provides an under-speed range in which maximum regulating control by ignition advance is exercised.

The effective gain of the system is preferably selectable by selecting the crankshaft position at which the time delay is initiated. The time delay can itself be modulated in response to any one or more of a number of engine operating parameters, but advantageously from a conventional closed loop idling speed control preferably with phase advance compensation.

An embodiment of this invention will now be described by way of example only and with reference to the accompanying drawings, in which:

FIG. 7 is a circuit diagram of an idling speed regulating section of the spark ignition control system, which section embodies a regulating system in accordance with this invention.

Figure 1:
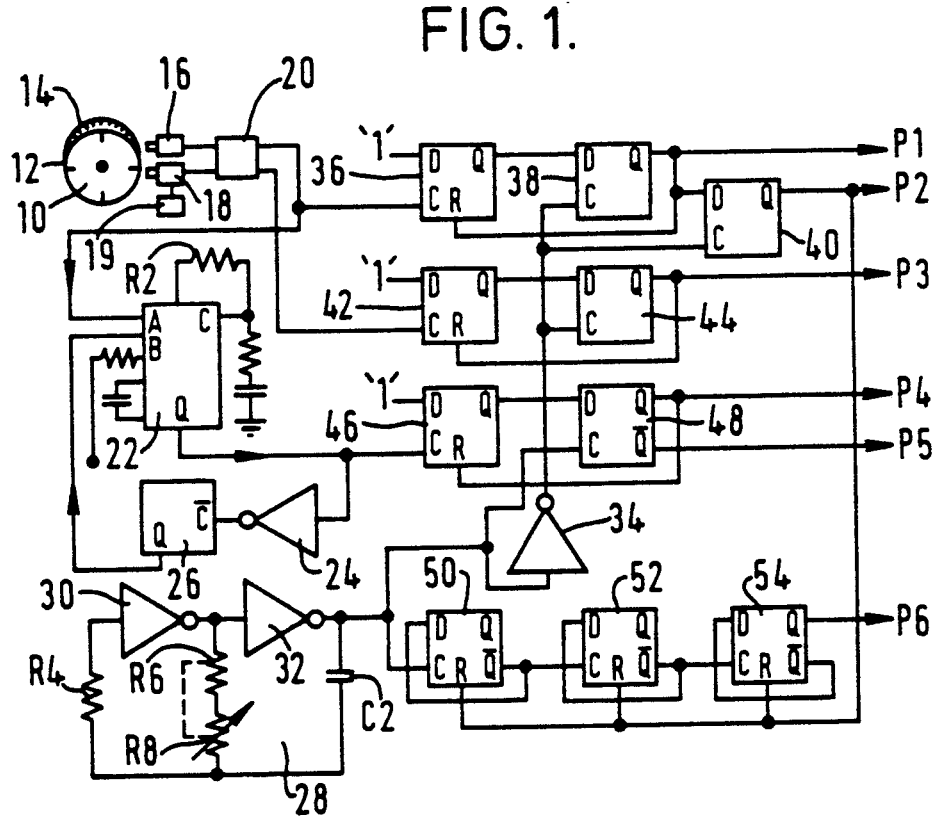
FIG. 1 is a circuit diagram of the signal generating section of a spark ignition control system for an internal combustion engine.

An idling speed regulator system in accordance with this invention is shown in the drawings as incorporated in an overall spark ignition control system for an internal combustion engine. The overall spark ignition system will first be described with reference to FIGS. 1 to 6 of the drawings and then the idling speed regulator system will be described with reference to FIG. 7.

Referring now to FIG. 1 there is shown the signal generating section of the system. This section includes a transducer assembly comprising a rotor 10 driven by the engine, the ignition of which is to be controlled. The rotor 10 has two sets of teeth 12 and 14, the set 12 having four teeth and the set 14 having thirtytwo teeth. Two variable-reluctance pick-ups 16 and 18 are associated with the respective sets of teeth 14, 12, the pick-up 16 being fixed to the casing of the transducer assembly and the pick-up 18 being angularly movable about the rotor axis by an engine parameter sensitive means in the form of a manifold vacuum transducer 19. The pick-ups 16, 18 are connected to the input of a pulse shaper 20 to produce two trains of rectangular profile pulses. It should be noted that the range of angular movement of the pick-up 18 is limited so as to ensure that the combined ordinal succession of the pulses is constant whatever the position of the pick-up 18. It is also to be noted that, although the pick-up 16 is fixed, in use, its position may be adjusted.

Figure 2:
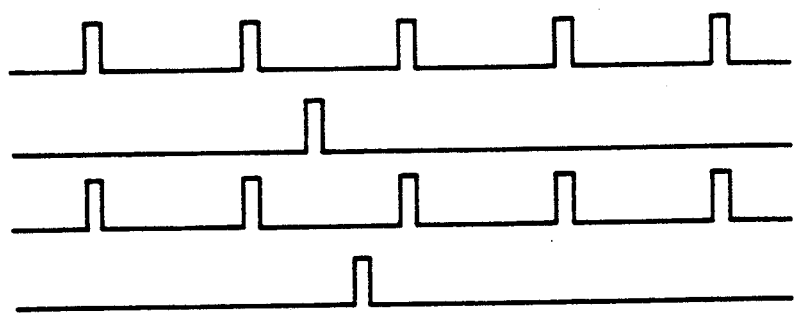
FIG. 2 shows waveforms of the signals generated in the section shown in FIG. 1.

In FIG. 2, the first two lines show one example of the output pulses of the pulse shaper 20 and the second two lines show the pulses after movement of the pick-up 18.

The output of the pulse shaper 20 associated with the pick-up 16 is connected to the input terminal (A) of the self bias circuit of a phase locked loop circuit 22. The phase locked loop circuit (PLL) 22 comprises a Motorola 14046 phase locked loop. The output of one of the phase comparators of the PLL 22 is connected through a resistor R2 to the input terminal (C) of the voltage controlled oscillator of the PLL 22. The output terminal (Q) of the voltage controlled oscillator is connected to the input terminal of an inverter 24, the output terminal of which is connected to the $\overline{\text{CLOCK}}$ input terminal ($\overline{\text{C}}$) of a divide-by-32 counter 26. The output terminal (Q) of the counter 26 is connected to the input terminal (B) of the phase comparators of the PLL 22. External resistors and capacitors are also connected to PLL as shown. The PLL 22 functions to produce pulses at the output terminal (Q) of the voltage controlled oscillator which are synchronized with, but at a frequency 32 times greater than the pulses produced at the output terminal of the shaper 20 associated with the pickup 16.

The section shown in FIG. 1 further includes a clock pulse generator, generally indicated at 28, which comprises an inverter 30, the output of which is connected to the input of an inverter 32. The output of the inverter 32 is connected through a capacitor C2 and a resistor R4, connected in series, to the input of inverter 30. The output of inverter 30 is also connected through a fixed resistor R6 and a variable resistor R8 to the junction of capacitor C2 and resistor R4. The clock pulses are produced at the output terminal of the inverter 32. The output of inverter 32 is also connected to the input of an inverter 34 to provide inverted clock pulses at the output thereof. The output terminal of the pulse shaper 20 associated with the pick-up 16 is connected to the C-input terminal of a C-D flip-flop 36, the D-input terminal of which is set to a logic "1". The Q-output terminal of flip-flop 36 is connected to the D-input terminal of a C-D flipflop 38, the C-input terminal of which is supplied with inverted clock pulses and the Q-output terminal of which is connected to the R-input terminal of flip-flop 36. Consequently a train of pulses P1 are produced at the Q-output terminal of flip-flop 38, these pulses being triggered by the pulses delivered to the C-input terminal of flip-flop 36, synchronized to the negative going edge of the clock pulses and having a duration equal to the period of the clock pulses.

The Q-output terminal of flip-flop 38 is connected to the D-input terminal of a C-D flip-flop 40, the C-input terminal of which is supplied with inverted clock pulses. Consequently, a train of pulses P2 is produced at the Q-output terminal of flip-flop 40, these pulses following the pulses P1 by one clock pulse period.

The output terminal of the pulse shaper 20 associated with the pick-up 18 is connected to the C-input terminal of a C-D flip-flop 42, the D-input terminal of which is set to a logic "1". The Q-output terminal of flip-flop 42 is connected to the D-input terminal of a C-D flip-flop 44, the C-input terminal of which is supplied with inverted clock pulses and the Q-output terminal of which is connected to the R-input terminal of flip-flop 42. Consequently, a train of pulses P3 are produced at the Q-output terminal of flip-flop 44, these pulses being triggered by the pulses delivered to the C-input terminal of flip-flop 42, synchronized to the negative going edge of the clock pulses, and having a duration equal to the period of the clock pulses.

The output terminal (Q) of the voltage controlled oscillator of the PLL 22 is connected to the C-input terminal of a C-D flip-flop 46, the D-input terminal of which is set to a logic "1". The Q-output terminal of the flip-flop 46 is connected to the D-input terminal of a C-D flip-flop 48, the C-input terminal of which is supplied with clock pulses and the Q-output terminal of which is connected to the R-input terminal of flip-flop 46. Consequently, a train of pulses P4 are produced at the Q-output terminal of flip-flop 48, these pulses being triggered by the output pulses of the voltage controlled oscillator, synchronized to the positive edges of the clock pulses, and having a duration equal to the period of the clock pulses. A train of pulses P5 are produced at the $\overline{Q}$-output terminal of flip-flop 48.

The clock pulses are also supplied to the C-input terminal of a C-D flip-flop 50, the $\overline{Q}$-output terminal of which is connected to its D-input terminal and also to the C-input terminal of a C-D flip-flop 52. The $\overline{Q}$-output terminal of flip-flop 52 is connected to its D-input terminal and also to the C-input terminal of a C-D flip-flop 54. The $\overline{Q}$-output terminal of flip-flop 54 is connected to its D-input terminal. The pulses P2 are supplied to the R-input terminals of flip-flops 50, 52, 54. Consequently a train of pulses P6 is produced at the Q-output terminal of flip-flop 54 which are synchronized by the pulses P2 and which have a frequency one eighth that of the clock pulses.

Figure 3:
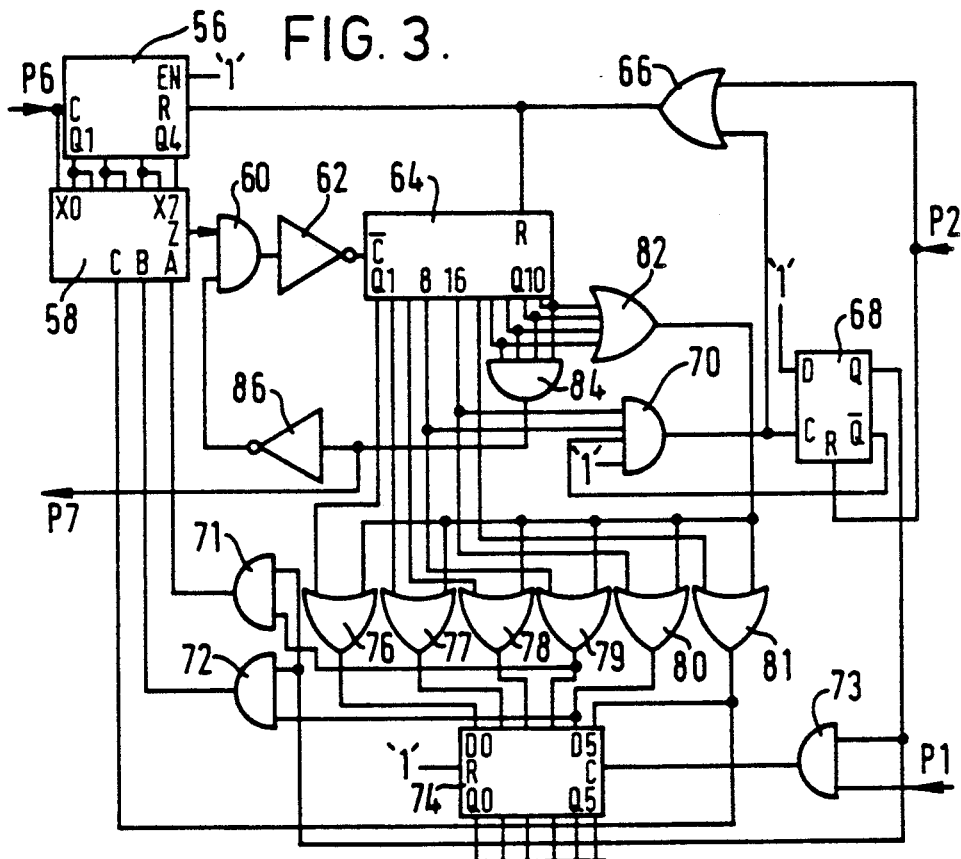
FIG. 3 is a circuit diagram of a section of the spark ignition control system which generates a multi-bit signal representing engine speed.

Referring now to FIG. 3, there is shown the section of the control which produces a multi-bit binary signal B1 representing the speed of the engine. In this section, the pulse train P6 is connected to the clock input terminal (C) of a counter 56 and also to the X0-input terminal of a data selector 58.

The counter 56 comprises one half of a Motorola MC 14520 dual-up counter and the selector 58 comprises a Motorola MC 14512 8-channel data selector. The Q1 output terminal of counter 56 is connected to the X1 and X2 input terminals of selector 58, the Q2 output terminal to the X3 and X4 input terminals, the Q3 output terminal to the X5 and X6 input terminals, and the Q4 output terminal to the X7 input terminal. The ENABLE terminal (EN) of counter 56 is set to a logic "1".

The Z output terminal of selector 58 is connected to one input terminal of an AND-gate 60, the output of which is connected to the input terminal of an inverter 62. The output terminal of inverter 62 is connected to the $\overline{\text{CLOCK}}$ input terminal ($\overline{C}$) of a counter 64. The counter 64 comprises a Motorola MC 14040 12-bit binary counter.

The pulse train P2 is supplied to one input terminal of an OR-gate 66, the output terminal of which is connected to the RESET terminals (R) of counters 56 and 64. The pulse train P2 is also supplied to the R-input terminal of a C-D flip-flop 68. The D-input terminal of flip-flop 68 is set to a logic "1" and the $\overline{Q}$-output terminal is connected to one input terminal of a four input AND-gate 70. The Q-output terminal of flip-flop 68 is connected to one input terminal of each of AND-gates 71 and 72 and also to one input of an AND-gate 73, the other input of which is supplied with the pulse train P1. The output terminal of AND-gate 73 is connected to the CLOCK input terminal of a latch 74. Latch 74 comprises a Motorola MC14174 hex type D flip-flop.

The Q1 to Q6 output terminals of counter 64 are connected respectively to one of the input terminals of OR-gates 76 to 81, the output terminals of which are connected respectively to the input terminals D0 to D5 of latch 74. The Q4 and Q5 output terminals of counter 64 are also connected respectively to two inputs of AND-gate 70, the remaining input of which is set to a logic "1". The output of AND-gate 70 is connected to the other input of OR-gate 66 and also to the C-input terminal of flipflop 68. The output of OR-gate 79 is connected to the other input of AND-gate 71, the output of which is connected to the A-control terminal of selector 58. The output of OR-gate 80 is connected to the other input of AND-gate 72, the output of which is connected to the B-control terminal of selector 58. The output of OR-gate 81 is also connected to the C-control terminal of selector 58. The outputs Q7 to Q10 of counter 64 are connected to the four inputs of a four input OR-gate 82 and to the four inputs of a four input AND-gate 84. The output of OR-gate 82 is connected to the other inputs of OR-gate 76 to 81. The output of AND-gate 84 is connected to the input of an inverter 86, the output of which is connected to the other input of AND-gate 60. The output of AND-gate 84 also supplies a signal P7, as will be described below, for deenergising the primary winding of the coil of the ignition system.

The R-input terminal of latch 74 is set to a logic "1" and the Q0 to Q5 output terminals of latch 74 provide a 6-bit binary output B1.

In operation, when a pulse P2 is received, counters 56 and 64 are reset via OR-gate 66 and flip-flop 68 is also reset. The control inputs A, B and C of selector 58 will all be at a logic "0" and so counter 64 will be incremented at the rate of the pulse train P6. When counter 64 reaches a count of 24, AND-gate 70 will become enabled and thus counters 56 and 64 will be reset via OR-gate 66: also flip-flop 68 will be set thereby enabling AND-gates 71, 72 and 73. The data at the input terminals of latch 74 cannot be latched by a pulse P1 until the flipflop 68 is set thereby preventing false data from being latched during the initial count of 24, for example during overspeed conditions. As the AND-gates 71 and 72 are now enabled, counter 64 will count the pulse P6 in a quasilogarithmic fashion and this will continue until a count of 63 is reached, whereupon the output of OR-gate 81 will go to logic "1". At this stage the output of all the OR-gates 76 to 81 are set at "1" and the selector 58 supplies pulses to counter 64 at the lowest rate, i.e. 1/16 the rate of pulse train P6. Counter 64 will then continue counting until it reaches the binary number 1111000000, at which stage AND-gate 84 will inhibit the counting action of counter 64 and a pulse P7 will be produced to de-energise the ignition coil.

If at any stage during the counting, a pulse P1 is received, the data at the input terminals of latch 74 will be latched to provide a 6-bit binary number B1 at the output terminals. Following the pulse P1, a pulse P2 will be received and the counting cycle will be repeated.

The number B1 is representative of the engine speed and, during normal operating conditions, a number B1 will be produced for each pulse P1. The pulse P7 will normally only be produced when the engine is stationary.

Figure 4:
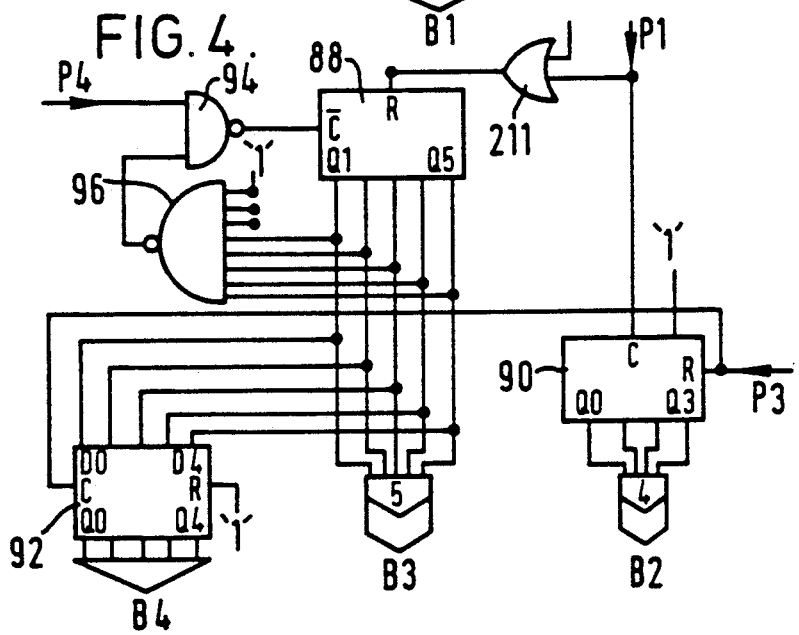
FIG. 4 is a circuit diagram of a section of the spark ignition control system which generates multi-bit signals representing engine intake manifold pressure and crankshaft position.

Referring now to FIG. 4 there is shown the section of the system which produces a binary number representative of the vacuum in the engine inlet manifold, and consequently of the engine load, and also a further two binary numbers representative of the crankshaft position.

In this system, pulses P1 are supplied to the RESET input terminal (R) of a counter 88 via an OR-gate 211 and to the CLOCK terminal (C) of a counter 90. The OR-gate 211 will be explained with reference to FIG. 7. The counter 88 comprises a Motorola MC14024 seven-stage ripple counter and the counter 90 comprises one half of a Motorola MC14520 dual-up counter. The pulses P3 are supplied to the RESET terminal (R) of counter 90 and also to the C-input terminal of a latch 92. Latch 92 comprises a Motorola MC14174 hex type D flip-flop. The pulses P4 are supplied to one input of a NAND-gate 94, the output of which is connected to the $\overline{CLOCK}$ terminal ($\overline{C}$) of counter 88. The output terminals Q1 to Q5 of counter 88 are connected to five of the inputs of an eight input NAND-gate 96, the other three inputs of which are set to a logic "1" and the output of which is connected to the other input of NAND-gate 94. The output terminals Q1 to Q5 of counter 88 are also connected to inputs D0 to D4 of latch 92, the R-input terminal of which is set to a logic "1".

In operation the counter 90 counts the pulses P1, which are associated with the pick-up 16, to produce a 4-bit binary number B2, and the counter 88 counts the pulses P4, which are associated with the PLL 22, to produce a 5-bit binary number B3. The binary number B2 and B3 together represent the crankshaft position to a resolution of 1/32 of the angular spacing of the teeth 14. The count of counter 88 is also latched in latch 92 by each pulse P3, which is associated with pick-up 18, to produce a binary number B4 representative of the position of pick-up 18 relative to the position of pick-up 16, and consequently of the vacuum in the inlet manifold. The counter 88 is prevented from overcounting by NAND-gate 96.

Figure 5:
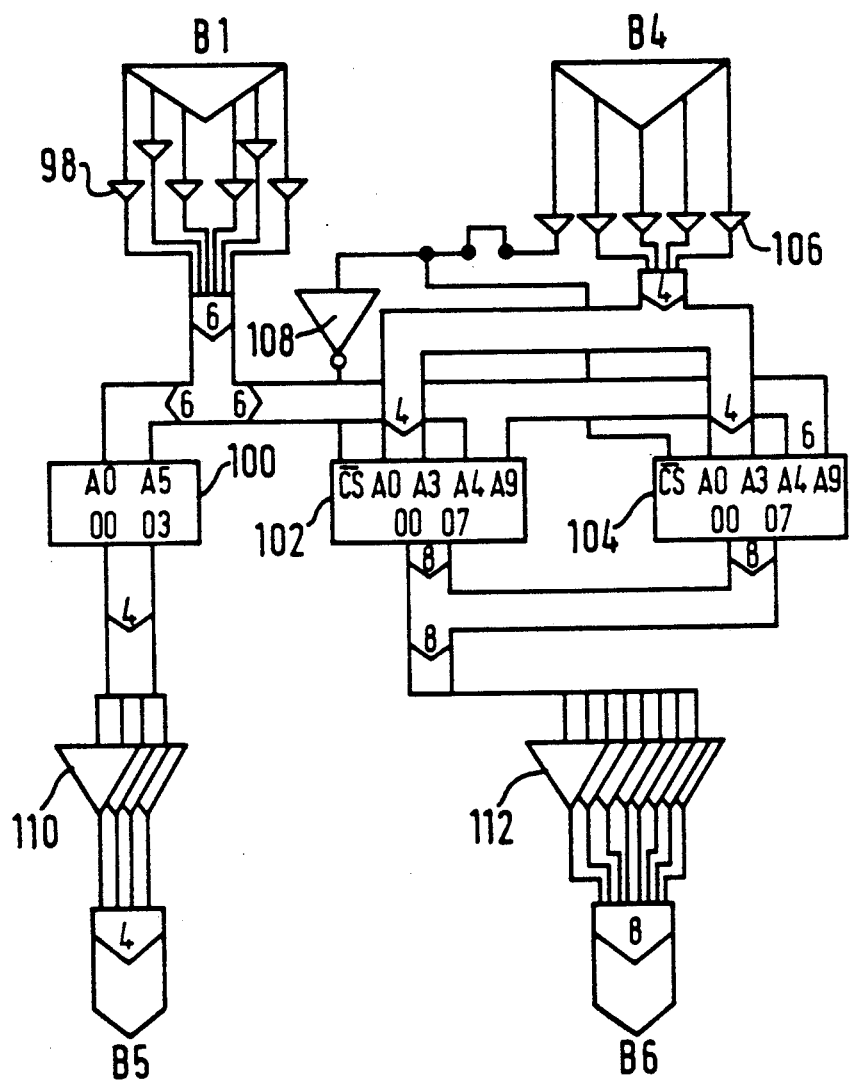
FIG. 5 is a circuit diagram of a section of the spark ignition control system which generates multi-bit signals representing the crankshaft positions at which the ignition coil should normally be energised and de-energised.

Referring now to FIG. 5 there is shown the section of the system which uses the binary numbers B1 and B4, which are representative respectively of the engine speed and manifold vacuum, to produce two further binary numbers which indicate the crankshaft positions at which the coil is to be energised and de-energised to produce an ignition spark. In this section, the binary number B1 is supplied through a set of buffers 98 to the address inputs A0 to A5 of a read-only-memory 100, to the address inputs A4 to A9 of a read-only-memory 102, and to the address inputs A4 to A9 of a read-only-memory 104. The memory 100 comprises an Intel 2704 read-only-memory, and the memories 102 and 104 each comprise an Intel 2708 read-only-memory. The four most significant bits of the number B4 are supplied through a set of buffers 106 to the address inputs A0 to A3 of memory 102 and also to the address inputs A0 to A3 of memory 104. The least significant bit of the number B4 is supplied to the input of one of the buffers 106. The output of this buffer is connected to the input of an inverter 108, the output of which is connected to the CHIP SELECT terminal ($\overline{CS}$) of memory 102, and also directly to the CHIP SELECT terminal ($\overline{CS}$) of memory 104.

The memories 100, 102 and 104 are empirically programmed with ignition timing data. The data output terminals 00 to 03 of memory 100 provide through a set of buffers 110 a four bit binary number B5 representative of the crankshaft position at which the ignition coil is to be energised. The memories 102 and 104 provide through a set of buffers 112 an eight bit binary number B6 representative of the crankshaft position at which the coil is to be deenergised to produce a spark.

In an alternative embodiment only one of the memories 102 and 104 is required, the least significant bit of the number B4 not being used.

Figure 6:
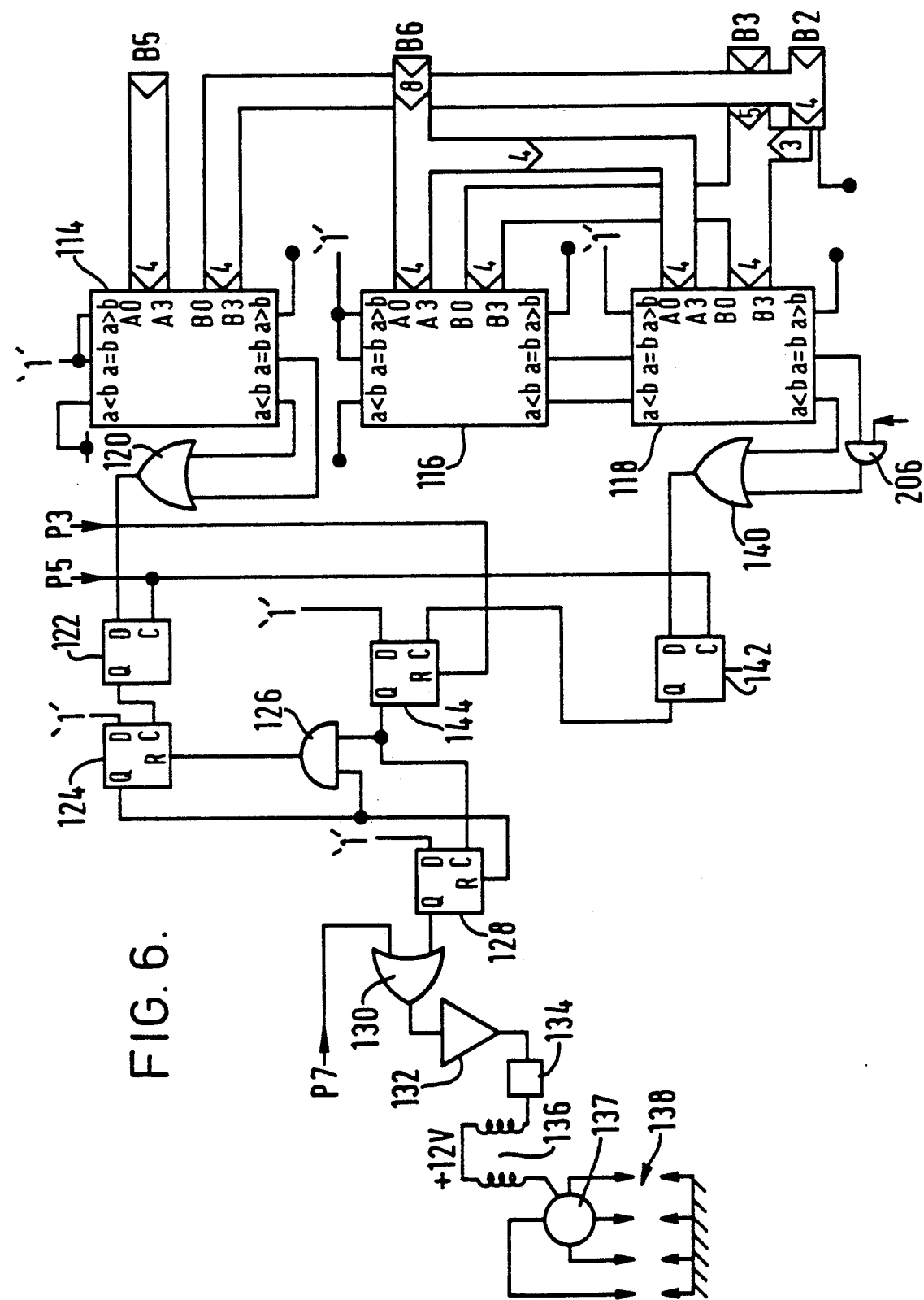
FIG. 6 is a circuit diagram of a section of the spark ignition control system which produces a signal for controlling current flow in the coil.

Referring now to FIG. 6, there is shown the section of the system which compares the numbers B2 and B3, which represent the actual crankshaft position with the numbers B5 and B6, which represent the crankshaft position at which the ignition coil is to be energised and de-energised, in order to control the coil. This section includes three comparators 114, 116 and 118, each of which comprises a Motorola MC14585 4-bit magnitude comparator.

In this section the binary number B5 is connected to the A0 to A3 comparing inputs of comparator 114. The four most significant bits of the number B6 are connected to the A0 to A3 comparing inputs of comparator 118 and the four least significant bits are connected to the A0 to A3 comparing inputs of the comparator 116. The four bits of the number B2 are supplied to B0 to B3 comparing inputs of comparator 114. The three least significant bits of number B2 are supplied to the B1 to B3 comparing inputs of comparator 118 and the most significant bit of number B3 is supplied to the B0 comparing input of comparator 118. The four least significant bits of the number B3 are supplied to the B0 to B3 comparing inputs of the comparator 116.

The A=B and the A>B cascading inputs of the comparator 114 are connected to a logic "1". The A<B and the A=B outputs are connected to the two inputs of an OR-gate 120, the output of which is connected to the D-input of a C-D flip-flop 122.

The C-input of the flip-flop 122 is connected to receive the pulse train P5 and the Q-output is connected to the C-input of a C-D flip-flop 124, the D-input of which is connected to a logic "1". The Q-output of flip-flop 124 is connected to one of the inputs of an AND-gate 126 and to the R-input of a C-D flip-flop 128. The Q-output of flipflop 128 is connected to one input of an OR-gate 130, the output of which is connected to a buffer 132. The output of buffer 132 is connected to the input of an ignition controller 134, the output of which control the primary of the ignition coil 136. The arrangement is such that the primary is energised when a logic "0" is present at the input of controller 134 and de-energised when the input is a logic "1". The secondary winding is connected to the input of a distributor 137, the four outputs of which are connected to four spark plugs 138.

The A=B and the A>B cascading inputs of comparator 116 are connected to a logic "1". The A<B and the A=B outputs of the comparator 116 are connected to the A<B and the A=B cascading inputs of comparator 118. The A<B and the A=B outputs of comparator 118 are connected to the two inputs of an OR-gate 140, the A=B output via an AND-gate 206 (which will be explained with reference to FIG. 7). The output of OR-gate 140 is connected to the D-input of a C-D flip-flop 142. The C-input of flip-flop 142 is connected to the pulse train P5. The Q-output of flip-flop 142 is connected to the C-input of a C-D flip-flop 144, the D-input of which is connected to a logic "1". The R-input of flip-flop 144 is connected to receive the pulse train P3. The Q-output of flip-flop 144 is connected to the other input of AND-gate 126 and to the C-input of flip-flop 128, the D-input of which is connected to a logic "1". The other input of OR-gate 130 is connected to receive the pulses P7. The output of AND-gate 126 is connected to the R-input of flip-flop 124.

In operation, with the coil 136 energised, when a logic "1" is produced at the A<B or the A=B output of comparator 118, a logic "1" will be delivered to the D-input of C-D flip-flop 142. Then, on receiving the next positive going pulse from the pulse train P5, flip-flop 142 will be set, thereby setting flip-flop 144, enabling AND-gate 126, setting flip-flop 128, and consequently deenergising coil 136 to produce a spark at the respective sparking plug 138. Subsequently, when a logic "1" is produced at the A<B or the A=B output of comparator 114, a logic "1" is delivered to the D-input of flip-flop 122. Then, on receiving the next positive going pulse from pulse train P5, flip-flop 122 will be set thereby setting flip-flop 124, re-setting flip-flops 124 and 128 and consequently energising the coil 136. Subsequently, when a pulse P3 is produced, the flip-flop 144 will be reset and the cycle can then be repeated. By using the pulses P3 to reset flip-flop 144, the possibility of double sparking or missed-sparks is avoided.

If the ignition system is switched on when the engine is stationary, a pulse P7 will be produced by AND-gate 84 (FIG. 3) which pulse will be delivered to OR-gate 130 thereby de-energising the coil 136 and preventing overheating.

It is to be appreciated that as the latches 74 and 92 are controlled by negative going clock pulses whilst the flip-flops 142 and 122 are controlled by positive going clock pulses, errors which might otherwise occur during transition states of memories 100, 102 and 104 are avoided.

It is also to be appreciated that the comparator 118 determines the first or "coarse" part of a delay period, and the comparator 116 determines the second or "fine" part of this delay period, between pulse shaper 20 generating a pulse associated with the pick-up 18 and the generation of a spark.

Although variable reluctance pick-ups 16, 18, are referred to above, the transducer assembly may use various other forms of sensor which may be magneto-electric or photo-electric.

Referring now to FIG. 7, there is shown the section of the system which regulates the idling speed. A timer counter 201 has its R-input terminal connected to the $\overline{Q}$ output of a flip-flop 202 and its C-input terminal connected to the output of a frequency-controllable oscillator 203 via an AND-gate 207. The $Q_n$ output terminal of counter 201 is connected to the other input of AND-gate 207 through an inverter 208. Flip-flop 202 has its R-input terminal connected to receive the pulse train P3 and receives an input on its C-input terminal from an AND-gate 209 when the number B2 reaches a predetermined value, which is 3 in the example shown.

A D-type flip-flop 205 has its C-input terminal connected to receive the pulse train P3. Its Q-output and the $Q_{n-1}$ output of counter 201 are connected to an OR-gate 210. The A=B output of comparator 118 and the output of OR-gate 210 provide the inputs to an AND-gate 206. The A<B output of comparator 118 and the output of AND-gate 206 provide the inputs for OR-gate 140, which in turn provides an output for the D-type flip-flop 142 of FIG. 6.

The $\overline{Q}$-output of D-type flip-flop 205 is connected to one input of an AND-gate 212. The two other inputs of this AND-gate 212 receive the "2" and "4" bits of the number B2 and the output of AND-gate 212 provides one input to OR-gate 211, the other input of which receives the pulse train P1. The output of OR-gate 211 is connected to the R-input terminal of counter 88, as also shown in FIG. 4.

The D-input of flip-flop 205 is connected to a circuit which includes a closed throttle abutment contact 204 arranged in series with a resistor R10 between ground and a logic "1" voltage level. The junction between contact 204 and resistor R10 is connected via a series resistor R11 to the D-input of flip-flop 205, a capacitor C3 being provided on this input for smoothing out H.F. noise picked up in the wiring to contact 204.

Considering the operation of the section shown in FIG. 7, the closed throttle abutment contact 204 is sampled, at each pulse of train P3, by the D-type flip-flop 205. Whilst contact 204 is open, flip-flop 205 will remain set, so that its Q-output is at logic "1" and its $\overline{Q}$-output at logic 0. Thus AND-gate 206 is enabled (via OR-gate 210) to respond to an A=B output from comparator 118: also, AND-gate 212 is disabled by the $\overline{Q}=0$ output of flip-flop 205, and counter 88 is reset only by pulses of train P1 via OR-gate 211. Hence, with the throttle open and therefore switch 204 open, the system operates as described above in full with reference to FIGS. 1 to 6 of the accompanying drawings.

In idling conditions however, contact 204 will close and flip-flop 205 accordingly provides a logic 0 on its Q-output and logic "1" on its $\overline{Q}$-output. Counter 88 is therefore held reset during the time that number B2=6 (i.e. the AND-gate 212 provides an output during this time), so that the "fine" or timed part of the delay is held at zero. Furthermore, AND-gate 206 is no longer enabled by flip-flop 205 via OR-gate 210, and will only be enabled when an output is delivered from the $Q_{n-1}$ terminal of counter 201, as will now be described.

At a predetermined value of the number B2, for example 3 in the example shown (i.e. upon the third pulse P1 from pick-up 16 after the last reset of counter 90 by a pulse P3 from pick-up 18), flip-flop 202 responds and accordingly removes the reset input to timer counter 201. This timer counter 201 then proceeds to count the pulses generated by the oscillator 203. At idling speeds, the $Q_{n-1}$ bit of counter 201 will be provided before the counter is reset by a pulse P3 via flip-flop 202. At less than half normal idling speed, the $Q_n$ bit of counter 201 will appear before the next pulse P3, with the result that the counter 201 is inhibited from further counting by means of inverter 208 removing the respective input from AND-gate 207: also the $Q_{n-1}$ bit is no longer provided.

The ROM data B5, B6 corresponds to B3=0 and B2=6 under idling conditions, in the example shown. Counter 88 is held reset whilst B2=6, as described above, so that comparator 118 will provide its A=B output throughout the time that B2=6. Thus, under idling conditions and when therefore switch 204 is closed so that the Q-output of flip-flop 205 is absent, AND-gate 206 is enabled via OR-gate 210 when the $Q_{n-1}$ output of timer 201 appears: an output is thus now applied from AND-gate 206 via OR-gate 140 to the D-type flip-flop 142 to generate the spark.

Accordingly, the spark has been generated a predetermined time delay (i.e. the period taken for timer 201 to reach the count $Q_{n-1}$) after an initial crankshaft position, defined by B2=3 in the example shown.

At less than half normal idling speed, the $Q_{n-1}$ output will disappear before comparator 118 provides its A=B output, i.e. a longer time delay will expire before the crankshaft reaches the position defined by B2=6, this longer time delay corresponding to a count providing the output $Q_n$, which is twice the count which provides the output $Q_{n-1}$. The $Q_{n-1}$ output will therefore not provide a spark-triggering signal. Instead the spark will be triggered by the A<B output of comparator 118, i.e. when B2=7, which also applies when the idling speed is too high for $Q_{n-1}$ to appear before B2=7.

In effect, the engine speed is measured by the timer counter 201 over a time period terminating close to the instant of the spark generation. The magnitude of the time delay is large enough to produce a substantial angular change in the ignition timing for a small change in engine speed.

The time delay provided by timer counter 201 is constant in the example so far described. Preferably however it is controlled in response to engine operating variables and/or vehicle equipment controls (e.g. automatic transmission range selector, air conditioning etc.). For example the time delay may be controlled using a closedloop idling speed control 213 of conventional type, preferably with phase advance compensation and serving to further improve the dynamic response of the idling speed regulating system. The closed-loop idling speed control 213 provides an output which is applied to the oscillator 203 to control its frequency.

It will be appreciated that the idling speed regulating system is disabled except during idling. But when idling, the spark timing varies smoothly with speed between B2=6 and B2=7, the spark normally occuring in response to the arrival of $Q_{n-1}$, but being retarded to B2=7 for large over-speed error or advanced to B2=6 for large under-speed error (but with engine speed still above half normal idling speed) and reverting abruptly to B2=7 at lower or cranking speeds for starting. The maximum advance timing for idling (i.e. when B2=6) must be later than the time for optimum torque.

The time delay provided by timer counter 201 (whether modulated or not) may be initiated at a selectable crankshaft position, for example it may be switched to an earlier position (e.g. B2 less than 3) e.g. for warming up (fast idling). Instead for fast idling during warm-up, the frequency of the oscillator 203 may be altered to adjust the time delay imposed by counter 201.

The idling speed regulating system may be used in conjunction with an over-run fuel cut-off circuit in accordance with conventional practice. Instead, an override control may be provided to operate at high engine speeds.

What is claimed is:

1. An idling speed regulating system for an internal combustion engine having spark ignition, said system comprising:
   (i) spark generating means for generating an ignition spark;
   (ii) means for monitoring the rotary position of the engine crankshaft;
   (iii) means responsive to the position monitoring means for determining a predetermined time delay from when the crankshaft reaches an initial rotary position and triggering said spark generating means upon expiry of said time delay;
   (iv) means responsive to the position monitoring means for enabling the spark generating means only after the crankshaft has reached a first predetermined limiting position; and
   (v) means responsive to the position monitoring means for enforcing triggering of said spark generating means when the crankshaft reaches a second predetermined limiting position if said time delay has not expired wherein all of said means comprise a means for retarding ignition timing as engine idling speed increases.

2. An idling speed regulating system as claimed in claim 1, further comprising means for controlling said time delay in accordance with at least one operating parameter of the engine.

3. An idling speed regulating system as claimed in claim 2, in which said time delay controlling means serves to determine said time delay in accordance with engine speed variation.

4. An idling speed regulating system as claimed in claim 3, in which said time delay controlling means comprises a closed-loop idling speed control with phase advance compensation.

5. An idling speed regulating system as claimed in claim 1, further comprising a device for selecting said initial crankshaft position at which said time delay commences.

6. An idling speed regulating system as claimed in claim 1, further comprising means for triggering the sparkgenerating means when the crankshaft reaches the second limiting position if a longer time delay expires before the crankshaft reaches the first limiting position.

7. An idling speed regulating system as claimed in claim 1, comprising an oscillator, a counter driven by said oscillator and enabled upon the crankshaft reaching said initial position and providing an output signal upon reaching a predetermined count.

8. An idling speed regulating system as claimed in claim 7, further comprising a crankshaft-position circuit which provides a first output signal whilst the crankshaft is between the first and second limiting positions, the spark-generating means being triggered by the output signal from the counter when the first output signal is being provided by the crankshaft-position circuit.

9. An idling speed regulating system as claimed in claim 8, in which the crankshaft-position circuit provides a second output signal when the crankshaft reaches its second limiting position, the spark-generating means being triggered by the second output signal from the crankshaft-position circuit if not already triggered by the output signal from the counter.

10. An idling speed regulating system as claimed in claim 1, further comprising a throttle switch controlling the spark-generating means so that when the throttle is operated the spark timing is determined in accordance with engine speed and independently of said time delay.

11. An idling speed regulating system as claimed in claim 6, further comprising means for triggering the spark generating means when the crankshaft reaches the first limiting position if said time delay expires, but said longer time delay does not expire before the crankshaft reaches said first limiting position.

12. In an internal combustion engine having a spark ignition, an engine ignition controller for controlling the ignition of the engine at speeds above an idle speed and an idle speed regulating system that is disabled except during idling, said idle speed regulation system comprising:
  (i) spark generating means for generating an ignition spark;
  (ii) means for monitoring the rotary position of the engine crankshaft;
  (iii) means responsive to the position monitoring means for determining a predetermined time delay from when the crankshaft reaches an initial rotary position and triggering said spark generating means upon expiry of said time delay;
  (iv) means responsive to the position monitoring means for enabling the spark generating means only after the crankshaft has reached a first predetermined limiting position; and
  (v) means responsive to the position monitoring means for enforcing triggering of said spark generating means when the crankshaft reaches a second predetermined limiting position if said time delay has not expired wherein all of said means comprise a means for retarding ignition timing as engine idling speed increases.

* * * * *